(12) United States Patent
Konaka et al.

(10) Patent No.: US 6,420,498 B1
(45) Date of Patent: Jul. 16, 2002

(54) FLUIDIZED BED REACTOR FOR GAS PHASE OLEFIN POLYMERIZATION, PROCESS FOR POLYMERIZING OLEFIN AND PROCESS FOR PRODUCING OLEFINIC POLYMER

(75) Inventors: Tsutomu Konaka; Masashi Hamba; Yoshiyuki Ichikawa; Koichi Ogino, all of Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/562,184

(22) Filed: May 2, 2000

(30) Foreign Application Priority Data

Sep. 3, 1999 (JP) ............................ 11-249861

(51) Int. Cl.$^7$ ................................ C08F 2/34
(52) U.S. Cl. .................... 526/88; 526/901; 526/920; 422/139; 422/145
(58) Field of Search .............. 422/139, 145; 526/88, 901, 920

(56) References Cited

U.S. PATENT DOCUMENTS

| | | | |
|---|---|---|---|
| 3,931,134 A | 1/1976 | Hartmann et al. | 260/93.7 |
| 5,382,638 A | 1/1995 | Bontemps et al. | 526/67 |
| 5,929,180 A * | 7/1999 | Chinh | 526/901 X |
| 6,013,741 A * | 1/2000 | Ohtani et al. | 526/901 X |
| 6,284,848 B1 * | 9/2001 | Durand et al. | 526/901 X |

FOREIGN PATENT DOCUMENTS

EP   0 830 892   3/1998
WO   WO 98/47611  10/1998

* cited by examiner

Primary Examiner—Fred Teskin
(74) Attorney, Agent, or Firm—Sughrue Mion, PLLC

(57) ABSTRACT

There are provided:
(1) a fluidized bed reactor for gas phase olefin polymerization, which has at least one drawing-out means for drawing out olefinic polymer powder within every zone of:
  (i) a zone (zone X) from a gas distribution plate to a height $L_1$ satisfying the following formula (1); and
  (ii) another zone (zone Y) from a height $L_2$ satisfying the following formula (2) to a powder level height of a fluidized bed, $$L_1 < 0.1 \times D \quad (1)$$

$$L_2 = 0.1 \times D \quad (2)$$

wherein $L_1$ is a height from the gas distribution plate to an upper limit of said zone X; $L_2$ is a height from the gas distribution plate to a lower limit of said zone Y; and D is the inside diameter of the fluidized bed reactor for gas phase polymerization, in which the olefinic polymer powder forms the fluidized bed,
(2) a process for polymerizing olefin and
(3) a process for producing an olefinic polymer, each of which processes comprises the steps of:
  (i) polymerizing an olefin in the aforesaid reactor; and
  (ii) drawing out the produced olefinic polymer powder through the aforesaid drawing-out means for drawing out the olefinic polymer powder.

13 Claims, 2 Drawing Sheets

FLUIDIZED BED REACTOR FOR GAS PHASE OLEFIN POLYMERIZATION, PROCESS FOR POLYMERIZING OLEFIN AND PROCESS FOR PRODUCING OLEFINIC POLYMER

FIELD OF THE INVENTION

The present invention relates to a fluidized bed reactor for gas phase olefin polymerization, a process for polymerizing an olefin, and a process for producing an olefinic polymer.

BACKGROUND OF THE INVENTION

Recently, productivity of an olefinic polymer has been greatly increased owing to an improvement in an activity of a transition metal catalyst for olefin polymerization. As a result, an operation for removing the catalyst residue in the produced olefinic polymer after completion of the polymerization is omitted. When using such a highly active catalyst, gas phase polymerization, which carries out an olefin polymerization in a gas phase, is generally adopted, because the gas phase polymerization is the simplest in its operation after completion of the polymerization.

For such a gas phase polymerization, a fluidized bed reactor for a gas phase polymerization is usually used to carry out the polymerization smoothly. Here, the term, "fluidized bed reactor for gas phase polymerization", means a polymerization reactor which uses a fluidized bed. In the gas phase polymerization, particles present in the reactor are subjected to reaction in their suspended state, which is formed by a gas led into the reactor through many small holes of a gas distribution plate provided to the lower part of the reactor.

Polymer powder produced in the polymerization reactor is drawn out by a pressure difference between the inside pressure and the outside pressure of the reactor, through a drawing-out means such as a drawing-out pipe provided to a side wall of the reactor. In this regard, when an amount of a gas drawn out together with the polymer powder is increased, equipment costs and operation costs for treating the gas are also increased. Thus, how to improve a polymer powder drawing-out efficiency is one of problems for designing the fluidized bed reactor. Here, the term, "polymer powder drawing-out efficiency", means a proportion of the polymer powder contained in the reaction mixture drawn out through said drawing-out pipe. The larger the proportion, the better the efficiency.

As mentioned above, the process using a highly active catalyst in the fluidized bed reactor for a gas phase polymerization can give an olefinic polymer extremely efficiently. However, it happens occasionally that a higher temperature region is locally made at a very limited part in the fluidized bed, and as a result, the polymer powder is aggregated to form massive products. Said massive products fall on the gas distribution plate, and then stay near the reactor wall above the gas distribution plate. If the massive products are allowed to stay without drawing out from the polymerization reactor, it is highly possible that the massive products grow up to become larger massive products, or make troubles such as blocking up holes of the gas distribution plate, and thereby discontinuing the operation. Therefore, it is necessary to provide a drawing-out pipe to the reactor wall above and near the gas distribution plate to draw out the massive products together with the polymer powder.

However, there is a problem such that the olefinic polymer powder drawn out through such a drawing-out pipe is accompanied with a remarkable amount of the gas, which makes the polymer powder drawing-out efficiency inferior.

Further, when an intermittently drawing-out process, which is carried out in a manner such that a valve connected on the way of a drawing-out pipe is opened and shut at a predetermined time interval, is adopted, there is another problem such that when a time of shutting the valve is too long, the polymerization activity-carrying polymer powder, which remains in the pipe and the valve, forms massive products due to insufficient removal of heat, and thereby blocking up the pipe with the massive products.

SUMMARY OF THE INVENTION

Accordingly, an object of the present invention is to provide a fluidized bed reactor for gas phase olefin polymerization, a process for polymerizing an olefin, and a process for producing an olefinic polymer, which can draw out massive products together with the olefinic polymer powder with high efficiency.

Another object of the present invention is to provide a process for polymerizing an olefin, and a process for producing an olefinic polymer, whereby the massive products can be drawn out together with the olefinic polymer powder with high efficiency, and moreover neither any area from a polymerization reactor to a valve for drawing out the olefinic polymer powder nor the inside of the valve can be blocked up with the massive products.

The present inventors have undertaken extensive studies to create a fluidized bed reactor for gas phase olefin polymerization, which can draw out massive products together with the olefinic polymer powder with high efficiency. As a result, it has been found that the object of the present invention can be accomplished by providing at least one drawing-out means within every two specific zones of a fluidized bed reactor for polymerization, and then drawing out the olefinic polymer powder through said drawing-out means. And thereby, the present invention has been attained.

Further, the present inventors have undertaken extensive studies to create a process for polymerizing olefin, whereby the massive products can be drawn out together with the olefinic polymer powder with high efficiency, and neither any area from a polymerization reactor to a valve for drawing out the olefinic polymer powder nor the inside of the valve can be blocked up with the massive products. As a result, it has been found that the object of the present invention can be accomplished by controlling a residence time of the olefinic polymer powder inside the drawing-out means within a specific time. And thereby, the present invention has been attained.

The present invention provides a fluidized bed reactor for gas phase olefin polymerization, which has at least one drawing-out means for drawing out olefinic polymer powder within every zone of:

(i) a zone (zone X) from a gas distribution plate to a height $L_1$ satisfying the following formula (1); and (ii) another zone (zone Y) from a height $L_2$ satisfying the following formula (2) to a powder level height of a fluidized bed, $$L_1 < 0.1 \times D \tag{1}$$

$$L_2 = 0.1 \times D \tag{2}$$

wherein $L_1$ is a height from the gas distribution plate to an upper limit of said zone X; $L_2$ is a height from the gas distribution plate to a lower limit of said zone Y;

and D is the inside diameter of the fluidized bed reactor for gas phase polymerization, in which the olefinic polymer powder forms the fluidized bed.

The present invention also provides a process for polymerizing an olefin, which comprises the steps of (i) polymerizing an olefin in the aforesaid fluidized bed reactor for gas phase polymerization and (ii) drawing out the produced olefinic polymer powder through said drawing-out means.

The present invention further provides a process for producing an olefinic polymer, which comprises the steps of (i) polymerizing an olefin in the aforesaid fluidized bed reactor for gas phase polymerization and (ii) drawing out the produced olefinic polymer powder through said drawing-out means.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

Figure 1:
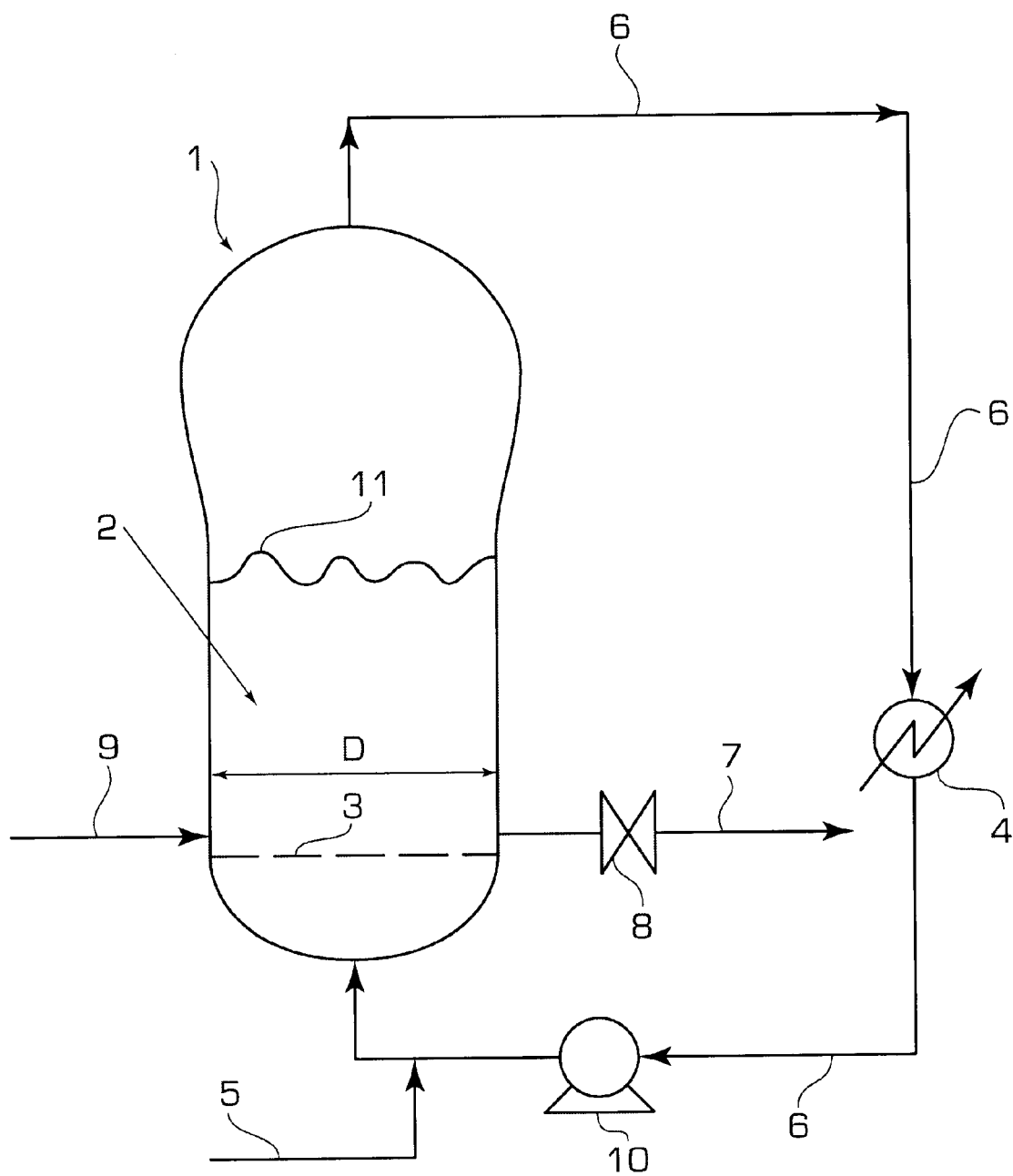
FIG. 1 shows a schematic view illustrating a conventional fluidized bed reactor for gas phase polymerization.

Reference numerals in FIGS. 1 and 2 denote as follows:

1: Polymerization reactor
2: Fluidized bed
3: Gas distribution plate
4: Heat exchanger
5: Feeding line for olefin or olefin-containing gas
6: Circulation line of circulated gas
7: Drawing-out line for polymer powder
8: Valve for drawing out polymer powder
9: Feeding line for catalyst
10: Circulation blower
11: Powder level height of fluidized bed
12: Drawing-out line for polymer powder within zone X
12': Drawing-out line for polymer powder within zone Y
13: Valve
13': Valve.

DETAILED DESCRIPTION OF THE PREFERRED EMBODIMENT

The fluidized bed reactor for gas phase polymerization in accordance with the present invention is characterized by having at least one drawing-out means for drawing out olefinic polymer powder within every zone of the zones X and Y as defined above, whereby the polymer powder drawing-out efficiency can be extremely improved.

The term, "powder level height of a fluidized bed", in the present invention means an upper end height of the fluidized bed. The powder level height can be measured by any conventional method known in the art such as, for example, a method of measuring the powder level height using a γ-ray densimeter (refer to JP-B 3-32562, which is incorporated herein by reference in its entirety), and a method of measuring the powder level height based on pressure difference between pressure at an optional position inside the space above the fluidized bed, and pressure at an optional position inside the fluidized bed (refer to JP-B 8-259612, which is incorporated herein by reference in its entirety).

A preferred range of the zone X is from the gas distribution plate to a height as near as possible the gas distribution plate, provided that the height satisfies the above-defined formula (1). A preferred range of the zone Y is from the height $L_2$ satisfying the above-defined formula (2) to a height satisfying 0.3×D. When the drawing-out means within the zone Y is provided in the neighborhood of the powder level height of the fluidized bed, it may happen that only a gas is substantially drawn out because of a change of the powder level height.

With respect to numbers of the drawing-out means provided, it is possible to provide a plurality of the drawing-out means within every zone of the zones X and Y. However, from an economical point of view, it is preferred to provide one drawing-out means within every zone of the zones X and Y.

Specific embodiments for the drawing-out means are not particularly limited. For example, a drawing-out line can be enumerated as a preferred drawing-out means, which is made by connecting a drawing-out pipe directly to the reactor.

The inside diameter of the drawing-out pipe is not particularly limited, and may be appropriately determined depending on an output of the olefinic polymer produced. The inside diameter of the drawing-out pipe provided within the zone X may be the same as that of the drawing-out pipe provided within the zone Y, or may be larger than that of the drawing-out pipe provided within the zone Y, or vice versa.

The olefinic polymer powder may be drawn out continuously or intermittently. It is preferred to draw out the polymer powder intermittently. How to draw out the olefinic polymer powder intermittently is not particularly limited. For example, there is enumerated a process wherein a valve, which is connected to the drawing-out pipe, is opened and shut repeatedly at a definite time interval to draw out the polymer powder.

Considering a fact that the polymer powder drawing-out efficiency of the drawing-out means provided within the zone Y is better than that of the drawing-out means provided within the zone X, it is preferred to make an amount per unit time (for example, kg/hr) of the polymer powder, which is drawn out through the drawing-out means provided within the Y zone, equal to or not less than that per unit time (for example, kg/hr) of the polymer powder, which is drawn out through the drawing-out means provided within the zone X; whereby the polymer powder can be drawn out more efficiently. When only one drawing-out means is provided within every zone of the zones X and Y, there is exemplified a specific drawing-out process of high efficiency, wherein the drawing-out from the zone Y is carried out several times per drawing-out from the zone X. In this specific process, it is possible to carry out each drawing-out of the polymer powder through the drawing-out means provided within the zones X and Y simultaneously. However, in order to prevent a pulse-like pressure increase in a vessel, which can be connected to the polymerization reactor by a line for receiving the drawn-out powder, it is rather preferred to carry out each drawing-out of the polymer powder with a time lag.

In the aforementioned intermittently drawing-out process using the drawing-out pipe provided with a valve, the polymerization activity-carrying polymer powder stays within an area from the polymerization reactor to the valve or inside the valve. When a residence time of said polymer powder within said area or inside the valve is prolonged, it may happen that the polymer powder is aggregated to form massive products due to an insufficient removal of heat, and as a result, said area or the inside of the valve may be blocked up with said massive products. In order to prevent said blocking-up, it is preferred to determine a residence time t (sec) of the polymer powder inside the drawing-out means such as the drawing-out pipe provided with a valve according to the following formula (3), $$t(\text{sec}) \leq 50 \times \tau \tag{3}$$

wherein τ is represented by the following formula (4) to denote an average residence time (hr) of the polymer powder in the fluidized bed reactor for gas phase polymerization, $$\tau(\text{hr}) = \text{Amount of polymer powder forming fluidized bed/Output of polymer per hour.} \tag{4}$$

The formula (3) is given as one example for determining the residence time within the area from the polymerization reactor to the valve or inside the valve, in the case where the drawing-out pipe provided with a valve is used. Said formula can be also used to determine a residence time in the case where the polymer powder stays inside any vessel, which is connected to the fluidized bed reactor for gas phase polymerization through any drawing-out pipe.

The polymerization reactor in accordance with the present invention is provided with a gas distribution plate. In order to carry out polymerization favorably, a preferable gas distribution plate is a particle-revolution type gas distribution plate, which can blow a circulated gas in a horizontal direction and in a substantially circumferential direction of the polymerization reactor (refer to JP-A 6-136013, which is incorporated herein by reference in its entirety). This type of the gas distribution plate can push away massive products in the neighborhood of the inner wall of the polymerization reactor, and then can revolve the massive products along the wall.

In addition, the polymerization reactor in accordance with the present invention is preferably provided with a massive product-detecting equipment, which can detect the massive products by-produced in the polymerization reactor with high sensitivity (refer to JP-A 10-36447, which is incorporated herein by reference in its entirety). The massive product-detecting equipment is provided usually in the neighborhood of the inner wall of the polymerization reactor. It is preferred to use both of the particle-revolution type gas distribution plate mentioned above, and the massive product-detecting equipment at the same time. That is, by means of the particle-revolution type gas distribution plate, the massive products produced can be pushed away in the neighborhood of the inner wall of the polymerization reactor, and then can be revolved along the wall; and therefore the massive products can be effectively detected by means of the massive product-detecting equipment provided in the neighborhood of the inner wall of the polymerization reactor.

In order to draw out effectively the massive products together with the polymer powder according to the present invention, usually, it is preferable to carry out the drawing-out from the zone Y several times per drawing-out from the zone X. When detecting generation of massive products by means of the massive product-detecting equipment, frequency of the drawing-out from the zone X can be increased, so that the massive products can be drawn out from the reactor prior to growth of the massive products into larger massive products. As a result, it can be avoided beforehand to possibly discontinue the operation due to either growth of the massive products into the larger massive products on the gas distribution plate, or other troubles induced by aggregation.

The fluidized bed reactor for gas phase polymerization in accordance with the present invention is illustrated with reference to the drawings as follows.

FIG. 1 shows a schematic view. illustrating a conventional fluidized bed reactor for gas phase polymerization. In FIG. 1, the numeral 1 denotes a polymerization reactor, the numeral 2 denotes a fluidized bed wherein an olefinic polymer powder is fluidized by a circulated gas,, the numeral 3 denotes a gas distribution plate, the numeral 4 denotes a heat exchanger, the numeral 5 denotes a feeding line for an olefin or an olefin-containing gas, the numeral 6 denotes a circulation line of a circulated gas, the numeral 7 denotes a drawing-out line for an olefinic polymer powder produced, the numeral 8 denotes a valve for drawing out the polymer powder, the numeral 9 denotes a feeding line for a polymerization catalyst, the numeral 10 denotes a circulation blower for circulating a gas to be circulated, the numeral 11 denotes a powder level height of the fluidized bed, and D denotes the inside diameter of the fluidized bed reactor for gas phase polymerization, wherein the olefinic polymer powder forms the fluidized bed.

Figure 2:
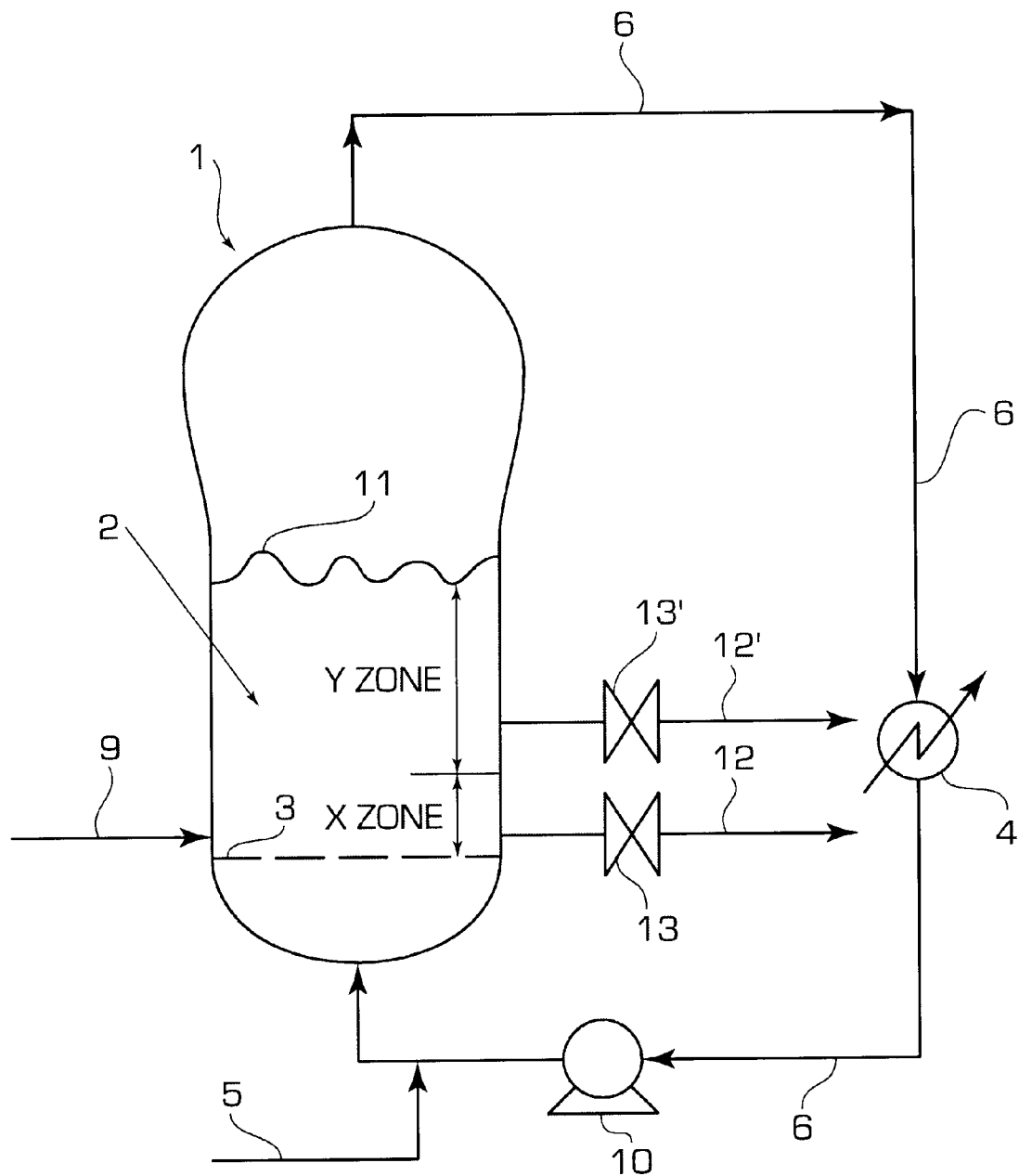
FIG. 2 shows a schematic view illustrating one embodiment of fluidized bed reactors for gas phase polymerization in accordance with the present invention.

FIG. 2 shows a schematic view illustrating one embodiment of fluidized bed reactors for gas phase polymerization in accordance with the present invention. In FIG. 2, the numerals from 1 to 6 and from 9 to 11 denote the same meanings as those defined for FIG. 1, and the numeral 12 denotes a drawing-out line for polymer powder within the zone X, the numeral 12' denotes a drawing-out line for polymer powder within the zone Y, and the numerals 13 and 13' denote a valve, respectively.

A catalyst is fed through the feeding line 9, and an olefin or an olefin-containing gas is fed through the feeding line 5. Polymerization is effected in the fluidized bed 2 above the gas distribution plate 3. The unreacted gas is circulated in the circulation line 6, subjected to heat removal with the heat exchanger 4, and then fed back to the reactor 1 with the aid of the circulation blower 10. According to the present invention, the valves 13 and 13' are opened and shut to keep the powder level height 11 of the fluidized bed constant, so that the olefinic polymer powder can be drawn out intermittently through the drawing-out lines 12 and 12'.

The catalyst used in the present invention is not particularly limited and may be those capable of contacting with a gaseous olefin to give the olefinic polymer. As polymerization catalysts known in the art, there are enumerated so-called metal oxide type catalysts, Ziegler-Natta catalysts and metallocene catalysts.

The olefin used in the present invention is not particularly limited. As the olefin, there is exemplified an α-olefin such as ethylene, propylene, 1-butene, 1-hexene and 1-octene. Said olefin can be used singly or in combination of two or more.

Also, the olefinic polymer obtained according to the present invention is not particularly limited. As the olefinic polymer, there are exemplified ethylene/1-butene copolymer and ethylene/1-hexene copolymer.

Pressure of the gas phase polymerization reaction may be kept within a range, wherein the olefin is allowed to form a gas phase in the reactor. The pressure is usually from about 0 to 5 Mpa, and preferably from about 1.5 to 3.0 Mpa. Temperature of the gas phase polymerization reaction can be determined depending on, for example, the catalyst used, the pressure applied in the reactor and the kind of the olefin used. The temperature is usually from about 30 to 110° C. The shape of the fluidized bed reactor for gas phase polymerization in accordance with the present invention is not particularly limited. The reactor may be provided with a stirring blade, or not.

According to the present invention, there can be provided (i) a fluidized bed reactor for gas phase olefin polymerization, (ii) a process for polymerizing an olefin and (iii) a process for producing an olefinic polymer, each of which processes can draw out massive products together with an olefinic polymer powder produced with high efficiency.

Further according to the present invention, there are provided a process for polymerizing olefin, and a process for producing an olefinic polymer, whereby a massive product as well as an olefinic polymer powder produced can be drawn out efficiently, and moreover neither any area from a polymerization reactor to a valve for drawing out an olefinic polymer powder nor the inside of the valve can be blocked up with massive products.

EXAMPLE

The present invention is illustrated in more detail with reference to the following Examples having reference to FIG. 2, which are only illustrative, and are not limitative for the scope of the present invention.

Example 1

Using a fluidized bed polymerization reactor 1 for gas phase polymerization having a volume of 0.78 m$^3$ (D=0.5 m, and therefore, $L_1$<0.1×D=0.05 m in the above formula (1), and $L_2$=0.1×D=0.05 m in the above formula (2)), a mixed gas of ethylene, 1-butene and hydrogen was brought into contact with a polymerization catalyst comprising a titanium based catalyst and an alkylaluminum compound as a co-catalyst to effect polymerization.

The produced olefinic polymer powder of ethylene/1-butene copolymer was drawn out through both a drawing-out line 12 (zone X) having a height of 0.01 m from a gas distribution plate 3 and a drawing-out line 12' (zone Y) having a height of 0.18 m from the gas distribution plate 3. The drawing-out was carried-out in a proportion of three times of the drawing-out through the drawing-out line 12' per the drawing-out through the drawing-out line 12.

0.0057 m$^3$ of gas under the polymerization pressure was drawn out per 1 kg of the olefinic polymer powder together with massive products.

Comparative Example 1

Example 1 was repeated except that the drawing-out of the olefinic polymer powder was carried out only through the drawing-out line 12 within the zone X. Although the massive products also could be drawn out, the volume of the drawn-out gas under the polymerization pressure was found to be 0.0094 m$^3$ per 1 kg of the olefinic polymer powder, which volume was greater than that of Example 1.

Comparative Example 2

Example 1 was repeated except that the drawing-out of the olefinic polymer powder was carried out only through the drawing-out line 12' within the zone Y. The volume of the drawn-out gas under the polymerization pressure was found to be 0.0044 m$^3$ per 1 kg of the olefinic polymer powder, which was superior to Example 1. However, the massive products could not be drawn out, so that a large amount of the massive products was accumulated in the reactor. Therefore, the polymerization could not be continued after a continuous operation of one week.

Example 2

Example 1 was repeated except that the height of the drawing-out line 12' within the zone Y was changed to be 0.28 m from the gas distribution plate 3. 0.0048 m$^3$ of the gas under the polymerization pressure was drawn out per 1 kg of the olefinic polymer powder together with massive products.

Example 3

Using the same fluidized bed polymerization reactor 1 as in Example 1, a mixed gas of ethylene, 1-butene and hydrogen was brought into contact with a polymerization catalyst comprising a titanium based catalyst and an alkylaluminum compound as a co-catalyst to effect polymerization. An average residence time τ of the polymer powder in the polymerization reactor 1 was 4.0 hr. Ttherefore, the value of the right in the above formula (3) was calculated to be 50×τ=50×4.0=200 (sec).

The valve 13 connected to the drawing-out line 12 was opened to draw out the polymer powder from the reactor 1, and thereafter it was shut. The valve 13 was left shut for 200 seconds, and thereafter it was opened. The produced polymer powder could be drawn out from the reactor 1 with no problem, and it wad found that neither the area from the polymerization reactor 1 to the valve 13 nor the inside of the valve 13 was blocked up with the massive products.

Similarly, the valve 13' connected to the drawing-out line 12' was opened to draw out the polymer powder from the reactor 1, and thereafter it was shut. The valve 13' was left shut for 200 seconds, and thereafter it was opened. The produced polymer powder could be drawn out from the reactor 1 with no problem, and it wad found that neither the area from the polymerization reactor 1 to the valve 13' nor the inside of the valve 13' was blocked up with the massive products.

Comparative Example 3

Example 3 was repeated except that respective valves 13 and 13' were left shut for 250 seconds. When the valves 13 and 13' were opened, it was found that the polymer powder staying within the area from the polymerization reactor 1 to the valve 13 or 13' and inside of the valve 13 or 13' was aggregated to form the massive products. Thereby the drawing-out pipe was blocked up, and as a result, the polymer powder could not be drawn out from the polymerization reactor 1.

Example 4

Example 3 was repeated except that an average residence time τ of the polymer powder in the polymerization reactor 1 was changed to 4.5 hours (the value of the right in the formula (3) was calculated to be 50×τ=50×4.5=225 (sec)).

The valve 13 connected to the drawing-out line 12 was opened to draw out the polymer powder from the reactor 1, and thereafter it was shut. The valve 13 was left shut for 200 seconds, and thereafter it was opened. The produced polymer powder could be drawn out from the reactor 1 with no problem, and it wad found that neither the area from the polymerization reactor 1 to the valve 13 nor the inside of the valve 13 was blocked up with the massive products.

Similarly, the valve 13' connected to the drawing-out line 12' was opened to draw out the polymer powder from the reactor 1, and thereafter it was shut. The valve 13' was left shut for 200 seconds, and thereafter it was opened. The produced polymer powder could be drawn out from the reactor 1 with no problem, and it wad found that neither the area from the polymerization reactor 1 to the valve 13' nor the inside of the valve 13' was blocked up with the massive products.

Comparative Example 4

Example 4 was repeated except that respective valves 13 and 13' were left shut for 250 seconds. When the valves 13 and 13' were opened, it was found that the polymer powder staying within the area from the polymerization reactor 1 to the valve 13 or 13' and inside of the valve 13 or 13' was aggregated to form the massive products. Thereby the drawing-out pipe was blocked up, and as a result, the polymer powder could not be drawn out from the reactor 1.

What is claimed is:

1. A fluidized bed reactor for gas phase olefin polymerization, which has at least one drawing-out means for drawing out olefinic polymer powder within every zone of:
   (i) a zone (zone X) from a gas distribution plate to a height $L_1$ satisfying the following formula (1); and
   (ii) another zone (zone Y) from a height $L_2$ satisfying the following formula (2) to a powder level height of a fluidized bed, $$L_1 < 0.1 \times D \quad (1)$$

$$L_2 = 0.1 \times D \quad (2)$$

wherein $L_1$ is a height from the gas distribution plate to an upper limit of said zone X; $L_2$ is a height from the gas distribution plate to a lower limit of said zone Y; and D is the inside diameter of the fluidized bed reactor for gas phase polymerization, in which the olefinic polymer powder forms the fluidized bed.

2. The fluidized bed reactor for gas phase olefin polymerization according to claim 1, wherein the drawing-out means for drawing out the olefinic polymer powder comprises a drawing-out line, which is made by connecting a drawing-out pipe directly to the fluidized bed reactor for gas phase polymerization.

3. The fluidized bed reactor for gas phase olefin polymerization according to claim 1, wherein the fluidized bed reactor has one drawing-out means for drawing out the olefinic polymer powder within every zone of the zone X and the zone Y.

4. A process for polymerizing olefin, which comprises the steps of:
   (i) polymerizing an olefin in a fluidized bed reactor for gas phase polymerization; and
   (ii) drawing out a produced olefinic polymer powder through a drawing-out means for drawing-out the olefinic polymer powder,
wherein the fluidized bed reactor for gas phase olefin polymerization has at least one drawing-out means of olefinic polymer powder within every zone of:
   (i) a zone (zone X) from a gas distribution plate to a height $L_1$ satisfying the following formula (1); and
   (ii) another zone (zone Y) from a height $L_2$ satisfying the following formula (2) to a powder level height of a fluidized bed, $$L_1 < 0.1 \times D \quad (1)$$

$$L_2 = 0.1 \times D \quad (2)$$

wherein $L_1$ is a height from the gas distribution plate to an upper limit of said zone X; $L_2$ is a height from the gas distribution plate to a lower limit of said zone Y; and D is the inside diameter of the fluidized bed reactor for gas phase polymerization, in which the olefinic polymer powder forms the fluidized bed.

5. The process for polymerizing olefin according to claim 4, wherein an amount per unit time of the polymer powder drawn out through the drawing-out means provided within the zone Y is not less than an amount per unit time of the polymer powder drawn out through the drawing-out means provided within the zone X.

6. The process for polymerizing olefin according to claim 4, wherein a residence time of the olefinic polymer powder inside the at least one drawing-out means is "t" satisfying the following formula (3), $$t(\text{sec}) \leq 50 \times \tau \quad (3)$$

wherein τ is an average residence time (hr) of the polymer powder inside the fluidized bed reactor for gas phase polymerization.

7. The process for polymerizing olefin according to claim 4, wherein the at least one drawing-out means for drawing out the olefinic polymer powder comprises a drawing out line, which is made by connecting a drawing-out pipe directly to the fluidized bed reactor for gas phase polymerization.

8. The process for polymerizing olefin according to claim 4, wherein the fluidized bed reactor has one drawing-out means for drawing out the olefinic polymer powder within every zone of the zone X and the zone Y.

9. A process for producing an olefinic polymer, which comprises the steps of:
   (i) polymerizing an olefin in a fluidized bed reactor for gas phase polymerization; and
   (ii) drawing out a produced olefinic polymer powder through a drawing-out means for drawing out the olefinic polymer powder,
wherein the fluidized bed reactor for gas phase olefin polymerization has at least one drawing-out means of olefinic polymer powder within every zone of:
   (i) a zone (zone X) from a gas distribution plate to a height $L_1$ satisfying the following formula (1); and
   (ii) another zone (zone Y) from a height $L_2$ satisfying the following formula (2) to a powder level height of a fluidized bed, $$L_1 < 0.1 \times D \quad (1)$$

$$L_2 = 0.1 \times D \quad (2)$$

wherein $L_1$ is a height from the gas distribution plate to an upper limit of said zone X; $L_2$ is a height from the gas distribution plate to a lower limit of said zone Y; and D is the inside diameter of the fluidized bed reactor for gas phase polymerization, in which the olefinic polymer powder forms the fluidized bed.

10. The process for producing an olefinic polymer according to claim 9, wherein an amount per unit time of the polymer powder drawn out through the drawing-out means provided within the zone Y is not less than an amount per unit time of the polymer powder drawn out through the drawing-out means provided within the zone X.

11. The process for producing an olefinic polymer according to claim 9, wherein a residence time of the olefinic polymer powder inside the at least one drawing-out means within every zone of zone X and zone Y is "t" satisfying the following formula (3), $$t(\text{sec}) \leq 50 \times \tau \tag{3}$$

wherein τ is an average residence time (hr) of the polymer powder inside the fluidized bed reactor for gas phase polymerization.

12. The process for producing an olefinic polymer according to claim 9, wherein the at least one drawing-out means for drawing out the olefinic polymer powder comprises a drawing-out line, which is made by connecting a drawing-out pipe directly to the fluidized bed reactor for gas phase polymerization.

13. The process for producing an olefinic polymer according to claim 9, wherein the fluidized bed reactor has one drawing-out means for drawing out the olefinic polymer powder within every zone of the zone X and the zone Y.

* * * * *